US00RE38463E

(19) United States
(12) Reissued Patent
Anderson et al.

(10) Patent Number: US RE38,463 E
(45) Date of Reissued Patent: Mar. 16, 2004

(54) SIGN SUSPENSION SYSTEM

(75) Inventors: Christopher S. Anderson, Stamford, CT (US); Louis J. Falcone, East Norwalk, CT (US); Arthur L. Torrence, Newtown, CT (US); Cary A. Cieciuch, Stratford, CT (US); Anthony C. Squitieri, Monroe, CT (US); Donna M. Stearns, c/o Retail Graphics 811 Park East Dr., Woonsocket, RI (US) 02053

(73) Assignees: Mechtronics Corporation, White Plains, NY (US); Donna M. Stearns, Medway, MA (US)

(21) Appl. No.: 09/103,260

(22) Filed: Jun. 23, 1998

Related U.S. Patent Documents

Reissue of:
(64) Patent No.: 5,529,274
Issued: Jun. 25, 1996
Appl. No.: 08/408,934
Filed: Mar. 23, 1995

(51) Int. Cl.[7] ..... A47H 1/10
(52) U.S. Cl. ..... 248/329; 40/601; 248/332; 254/46
(58) Field of Search ..... 248/329, 317, 248/320, 327, 328, 332, 338; 40/617, 601; 254/46

(56) References Cited

U.S. PATENT DOCUMENTS

| | | | | |
|---|---|---|---|---|
| 423,873 | A | 3/1890 | Kinney et al. | 284/544 |
| 580,770 | A | 4/1897 | Cashion | |
| 662,089 | A | 11/1900 | Pettey | |
| 943,651 | A | 12/1909 | Chandler et al. | |
| 1,471,454 | A | 10/1923 | Dolan et al. | |
| 2,074,660 | A | 3/1937 | Masoner | 248/323 |
| 2,144,397 | A | 1/1939 | Taddonio | 40/130 |
| 3,154,870 | A | 11/1964 | Hopp et al. | 40/128 |
| 3,181,274 | A | 5/1965 | Izenour | 50/24 |
| 3,609,898 | A | 10/1971 | Brown | 40/125 |
| 3,938,269 | A | 2/1976 | Catteau | 40/30 |
| 3,944,186 | A | 3/1976 | Einhorn et al. | 254/191 |
| 3,984,931 | A | 10/1976 | Belokin, Jr. | 40/130 |
| 4,057,211 | A | 11/1977 | Moore | 248/332 |
| 4,187,996 | A | 2/1980 | Ehrlich | 242/107.4 |
| 4,434,570 | A | 3/1984 | Roos | 40/617 |
| 4,767,101 | A | 8/1988 | Schweinberger | 254/391 |
| 4,872,632 | A | 10/1989 | Johnson | 248/332 |
| 5,188,332 | A | 2/1993 | Callas | 248/544 |
| 5,381,991 | A | 1/1995 | Stocker | 248/206 |
| 5,409,191 | A | 4/1995 | Wenmaekers | 248/317 |
| 5,438,780 | A | 8/1995 | Winner | 40/514 |

*Primary Examiner*—Ramon O. Ramrez
(74) *Attorney, Agent, or Firm*—Wiggin & Dana LLP; Dale L. Carlson; Michael K. Kinney

(57) ABSTRACT

A remote-controlled motor-driven drum is provided to wind and unwind a cord which holds a self-balancing sign carrier. The sign carrier, which has telescoping rails, is adjustable in width. Its center rail includes two sheaves to receive the cord and lead it from the drum back to an end secured to the ceiling. Thus, rotation of the drum serves to raise and lower the sign carrier and a sign carried by it. The sheaves on the carrier not only allow it to be raised and lowered, but also serve to make the unit self-balancing The user attaches a sign to the carrier when it is in its lowered position and then raises the sign and carrier to the ceiling. The motor, which is reversible, is remotely controlled either by wires leading between the motor and a switch or by radio control (with a control similar to that used on a garage door).

9 Claims, 3 Drawing Sheets

SIGN SUSPENSION SYSTEM

Matter enclosed in heavy brackets [ ] appears in the original patent but forms no part of this reissue specification; matter printed in italics indicates the additions made by reissue.

FIELD OF THE INVENTION

This invention relates to a system for suspending signs from the ceiling and for readily raising them to, and lowering them from, the ceiling. The system is particularly useful in retail stores.

BACKGROUND OF THE INVENTION

There are many instances in which a retailer desires to hang a sign from the ceiling, or near to the ceiling, of his store. This has, in the past, been a problem in that it has often involved obtaining and using a ladder, or otherwise getting access to the ceiling area.

The present invention obviates that problem.

BRIEF SUMMARY OF THE INVENTION

This invention utilizes a remote-controlled motor-driven drum as a winder, to wind and unwind a cord which is secured between a ceiling fixture and the drum and is holding a sign carrier. The sign carrier, which has telescoping rails, is adjustable in width, so as to hold different size signs. Its center rail includes two equally-spaced sheaves to receive the cord and lead it from the motor-driven drum to an end secured to the ceiling. Thus, motion of the drum serves to raise and lower the sign carrier and a sign carried by it. The equal spacing between the sheaves on the carrier and between the ceiling fixture and the drum serve to make the unit self-balancing.

The user attaches a sign to the carrier when it is in its lowered position and then uses the motor to raise the sign and carrier to the ceiling. The motor, which is reversible, is remotely controlled either by wires leading between the motor and a switch or by radio control (with a control similar to that used on a garage door). Reversing the motor, of course, serves to lower the sign so that it can be replaced.

DESCRIPTION OF THE DRAWINGS

FIG. 4 is an enlarged view, partially broken away, of the portion of the sign carrier which carriers one of the sheaves. It is shown in a dotted circle in FIG. 3. The other sheave is similar.

DETAILED DESCRIPTION OF THE INVENTION

Figure 6:
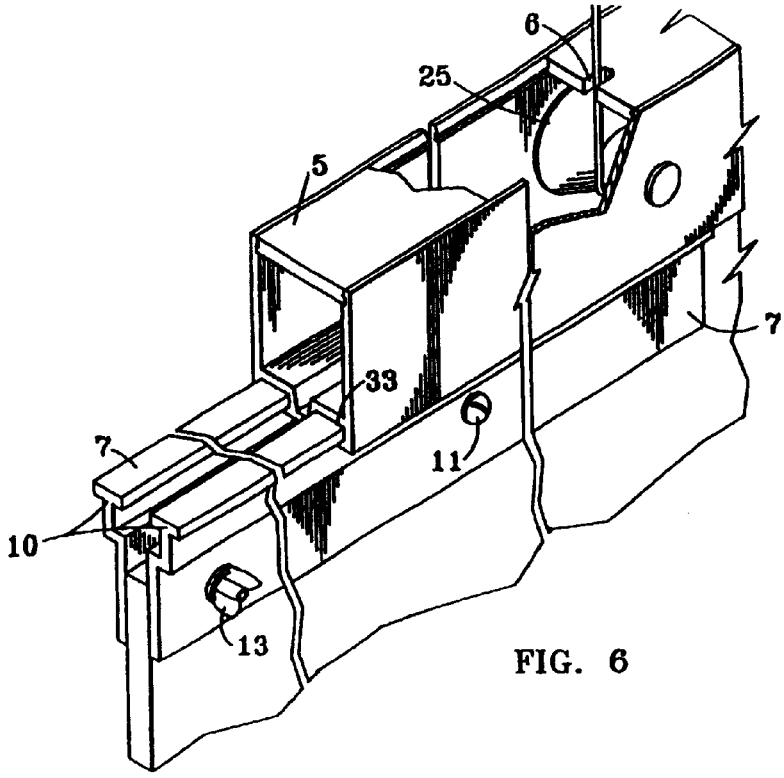
FIG. 6 is a perspective view of a portion of the sign-carrying rails and of one of the associated sheaves.
Figure 7:
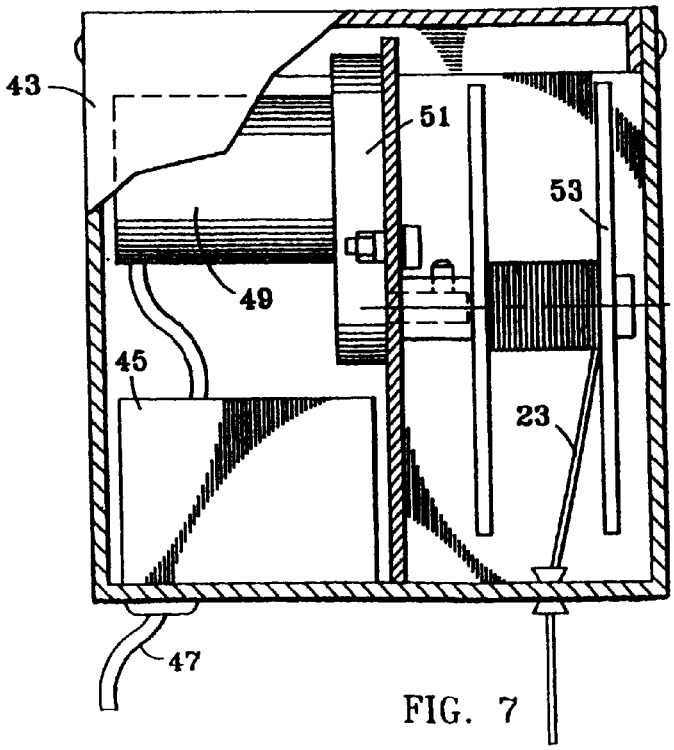
FIG. 7 is a front elevation, partially broken away, of the motor-drum section of the system.

Our self-balancing sign 1 is carried by supporting rails 3. Rails 3 include a center main rail 5 and side rails 7 and 9; and the side rails have T-shaped members 10 which telescope into slots 33 in center rail 5 (FIG. 6). The T-shaped members 10 are locked in position in rail 5 by holding bolts 11. The sign itself is held in the rails by thumb screws 13.

Center rail 5 carries sheaves 25 and 27, spaced equidistantly from the ends of rail 5. A supporting cord 23 passes through the sheaves, entering and leaving rail 5 through openings 6. Sheaves 25 and 27 are mounted in frames 29 and have drums 31 to carry the cord.

One end of the cord 23 is secured to the ceiling at ceiling attachment member 41, and the other end is wrapped around drum 53. Preferably the spacing between sheaves 25 and 27 is the same as the spacing between of the member 41 and the drum 53. This results in the sign balancing more readily.

Figure 1:
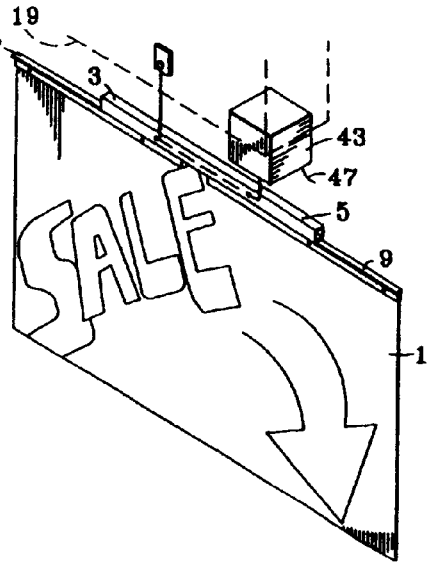
FIG. 1 is a perspective view of the sign suspension system with the sign carrier and its sign raised to the ceiling. The user, holding the remote control, is seen below the sign.
Figure 2:
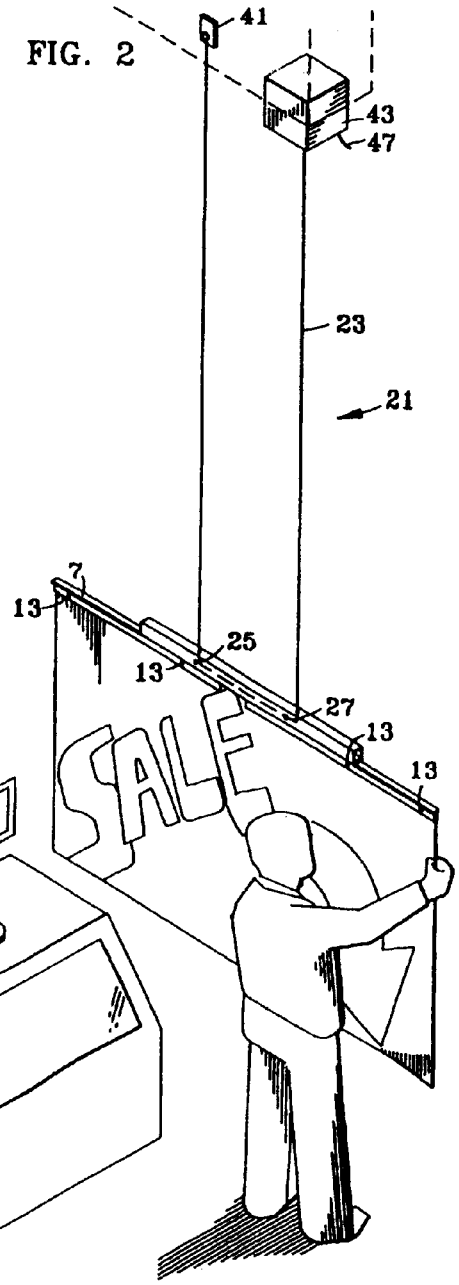
FIG. 2 is a similar perspective view, with the sign and carrier lowered so that the user can attach his desired sign to the carrier.
Figure 2:
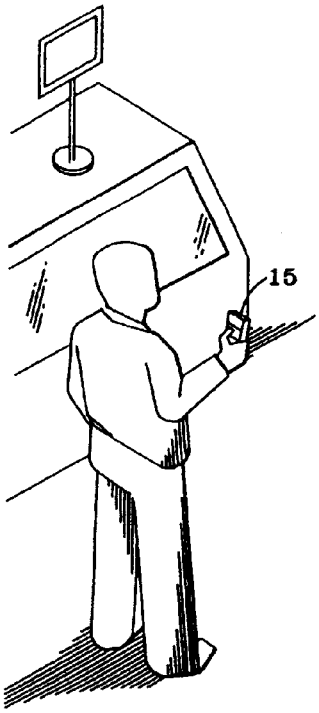
Figure 3:
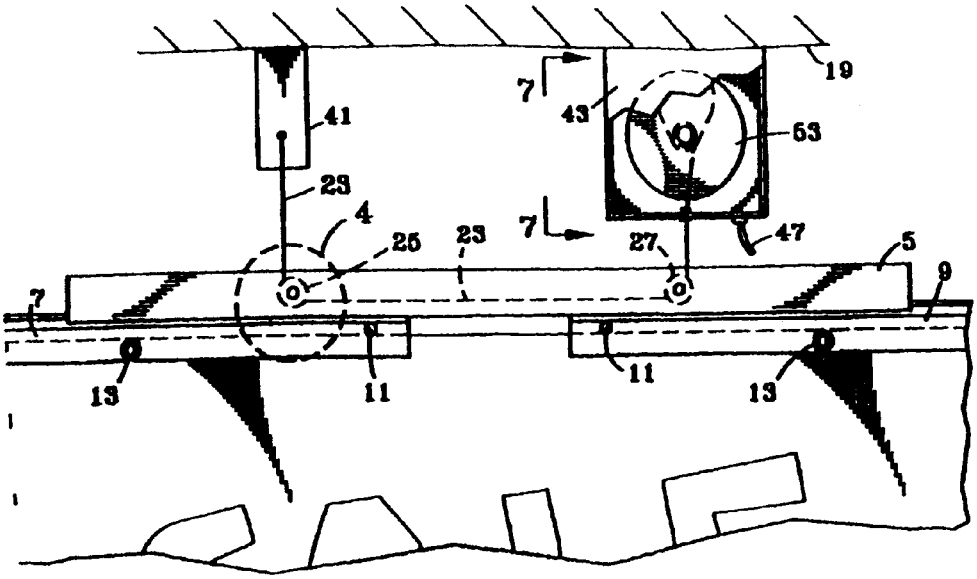
FIG. 3 is a front elevation showing details of the suspension system.
Figure 4:
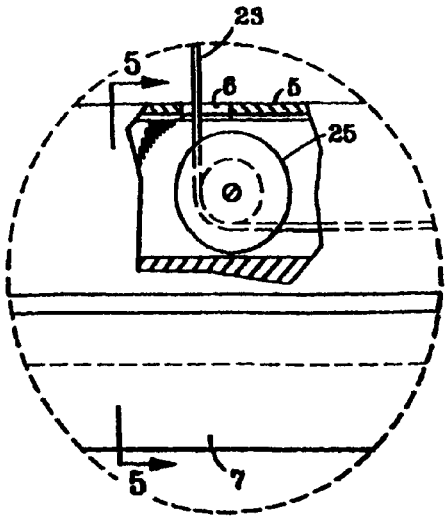
Figure 5:
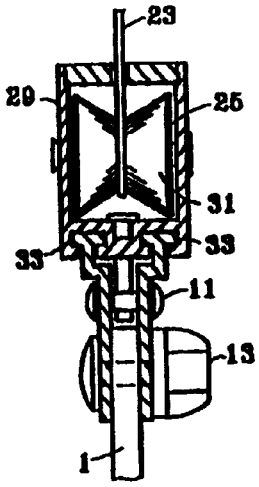
FIG. 5 is a section, taken on line 5—5 of FIG. 4, showing details of the sheave, suspending cord, and its interconnection to the central sign-carrying rail.

Sign support system 21 includes rails 3, cord 23, sheaves 25 and 27, ceiling attachment 41, and motor-operated drum unit 43. Drum unit 43 includes a control circuit 45, with antenna 47, a reversible motor 49, and reduction gear 51 leading from motor 49 to drum 53. Control circuit 45 is operated by remote control unit 15 (FIG. 1) and antenna 47 in a manner similar to radio-controlled garage doors. Alternatively, control unit 15 can be wired directly to control circuit 45 or be operated by infra-red. The control unit has off, forward, and reverse positions.

To use our sign suspension system, motor 49 is actuated in a direction so as to lengthen the cord 23, lowering the rails 3 from the ceiling. Main rail 5 and side rails 7 and 9 are then adjusted to provide a total length equal to the width of the sign 1 to be displayed 9 (with side rails 7 and 9 being extended equal amounts); and the holding bolts 11 are then tightened. The sign 1 is inserted between the rail sections, and thumb screw 13 is passed through the sign and the rail sections and tightened. Motor 49 is then operated in the opposite direction, to shorten cord 23, thus raising the sign to the ceiling. The sign will self-balance and hang horizontally at any height desired.

We claim:

1. A sign suspension system for suspending display signs from the ceiling, said system including a sign carrier, said carrier including at least one horizontal rail and two sheaves, a motor control unit including a reversible motor and a drum operated by said motor, said motor control unit being mounted at the ceiling, a cord-attaching member secured to the ceiling, a cord running from said cord-attaching member through said sheaves and to said drum, said cord supporting said sign carrier, and a remote control unit for operating said motor, said remote control unit having forward, reverse, and off positions, whereby said sign carrier, carrying a sign, can be raised and lowered to and from said ceiling.

2. A sign suspension system as set forth in claim 1 in which said sign carrier includes two side extension rails telescopically interfitting with said horizontal rail.

3. A sign extension system as set forth in claim 2 in which said horizontal rail includes slots and said side extension rails include T-shaped members fitting telescopically into said slots.

4. A sign suspension system as set forth in claim 1 in which said sheaves are spaced equidistantly from their respective ends of said horizontal rail.

5. A sign suspension system as set forth in claim 1 in which the distance between said sheaves and the distance between said cord-attaching unit and said drum are substantially the same, whereby said sign carrier is held in balanced suspension.

6. A sign suspension system as set forth in claim 1 including reduction gears between said motor and said drum.

7. A sign suspension system as set forth in claim 1 in which said remote control unit is radio-operated.

8. A sign suspension system for supporting signs from the ceiling of a building, said sign suspension system including a power-actuated drum system secured to said ceiling, suspension cord being carried by said drum, one end of said suspension cord being secured to said ceiling at a point remote from said drum, a control circuit for said drum system, a remote controller for operating said control circuit, a horizontal sign carrier, said sign carrier having spaced sheaves thereon, and said cord passing between said sheaves, whereby said cord serves to suspend said sign carrier, and attachment means for securing a sign to said carrier.

9. A sign suspension system as set forth in claim 8 in which said horizontal sign carrier includes a horizontal rail and two side extension rails telescopically interfitting with said horizontal rail.

* * * * *

Adverse Decision in Interference

Reissue Patent No. RE 38,463, Christopher S. Anderson, Louis J. Falcone, Arthur L. Torrence, Cary a. Cieciuch, Anthony C. Squitieri, Donna M. Stearns, SIGN SUSPENSION SYSTEM, Interference No. 105,286, final judgment adverse to the patentees rendered March 16, 2006, as to claims 1-9.

(*Official Gazette February 13, 2007*)